United States Patent
Deutscher

(10) Patent No.: US 11,598,362 B2
(45) Date of Patent: Mar. 7, 2023

(54) SCREW FASTENERS FOR USE IN BUILDING CONSTRUCTION

(71) Applicant: Ideal Fasteners Pty Ltd, Victoria (AU)

(72) Inventor: Neville Deutscher, Victoria (AU)

(73) Assignee: IDEAL FASTERNERS PTY LTD., Victoria (AU)

(*) Notice: Subject to any disclaimer, the term of this patent is extended or adjusted under 35 U.S.C. 154(b) by 410 days.

(21) Appl. No.: 16/716,835

(22) Filed: Dec. 17, 2019

(65) Prior Publication Data
US 2021/0088069 A1    Mar. 25, 2021

(30) Foreign Application Priority Data

Sep. 19, 2019    (AU) .................. 2019232872

(51) Int. Cl.
*F16B 25/10*    (2006.01)
*F16B 25/00*    (2006.01)

(52) U.S. Cl.
CPC ........ *F16B 25/103* (2013.01); *F16B 25/0015* (2013.01); *F16B 25/0021* (2013.01); *F16B 25/0042* (2013.01); *F16B 25/10* (2013.01)

(58) Field of Classification Search
CPC ........ F16B 15/06; F16B 23/003; F16B 25/00; F16B 25/0015; F16B 25/0021; F16B 25/0042; F16B 25/0078; F16B 25/103; F16B 25/10; Y10S 411/919
USPC .......... 411/387.1, 387.6, 394, 402–403, 411, 411/424, 426
See application file for complete search history.

(56) References Cited

U.S. PATENT DOCUMENTS

| | | | | |
|---|---|---|---|---|
| 3,699,841 A * | 10/1972 | Lanius, Jr. | .......... | F16B 25/0031 408/224 |
| 4,222,689 A * | 9/1980 | Fujiwara | ............... | F16B 25/103 408/227 |
| 4,856,953 A * | 8/1989 | Lin | ....................... | B25B 15/001 248/217.4 |
| 5,019,079 A * | 5/1991 | Ross | .................... | A61B 17/863 411/389 |
| 5,039,262 A * | 8/1991 | Giannuzzi | ........... | F16B 25/0026 411/178 |
| 5,160,225 A * | 11/1992 | Chern | .................... | F16B 13/002 408/209 |
| 5,199,839 A * | 4/1993 | DeHaitre | ............ | F16B 25/0078 411/399 |
| 5,516,248 A * | 5/1996 | DeHaitre | .............. | F16B 35/041 411/399 |
| 5,944,295 A * | 8/1999 | McSherry | ........... | F16B 25/0026 248/304 |
| 6,030,162 A * | 2/2000 | Huebner | ............ | A61B 17/8863 411/413 |
| 6,923,611 B2 * | 8/2005 | Kenny | ................ | F16B 25/0031 411/387.1 |

(Continued)

*Primary Examiner* — Roberta S Delisle
(74) *Attorney, Agent, or Firm* — Barnes & Thornburg LLP

(57) ABSTRACT

A screw fastener comprising: an elongate shank (3) having a screw thread (9) extending along at least a substantial portion of the shank; a drive section (7) located at one end of the shank for allowing the screw fastener to be rotatably driven into one or more material layers; and a self-drilling or piercing point (5) at an opposing end thereof for forming a bore in said one or more material layers; wherein the drive section is shaped to minimise or avoid the need for countersinking of the formed bore.

17 Claims, 2 Drawing Sheets

(56) References Cited

U.S. PATENT DOCUMENTS

| | | | |
|---|---|---|---|
| 7,235,079 B2* | 6/2007 | Jensen | A61B 17/8685 |
| | | | 606/151 |
| 7,377,019 B2* | 5/2008 | Haytayan | B25B 21/002 |
| | | | 81/463 |
| 7,934,895 B2* | 5/2011 | Ernst | F16B 37/127 |
| | | | 411/413 |
| 8,801,755 B2* | 8/2014 | Dreyfuss | A61B 17/0401 |
| | | | 606/232 |
| 2003/0223842 A1* | 12/2003 | Shinjo | F16B 35/06 |
| | | | 411/403 |
| 2003/0231941 A1* | 12/2003 | Kenny | F16B 25/10 |
| | | | 411/411 |
| 2014/0314522 A1* | 10/2014 | Lin | F16B 25/0047 |
| | | | 411/387.1 |
| 2014/0321943 A1* | 10/2014 | Mair | F16B 25/0063 |
| | | | 411/371.1 |
| 2015/0147137 A1* | 5/2015 | Ban | F16B 25/0015 |
| | | | 411/426 |
| 2016/0003283 A1* | 1/2016 | Call | F16B 25/0057 |
| | | | 411/386 |

* cited by examiner

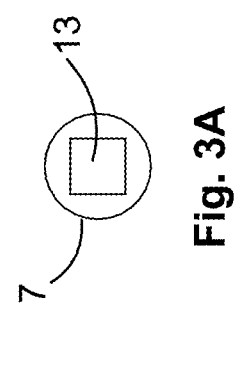
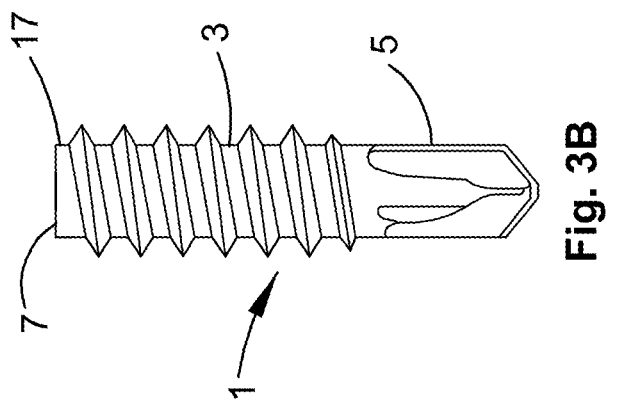
Fig. 1A
Fig. 1B
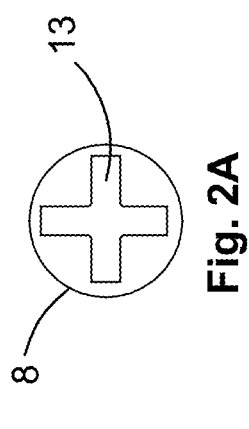
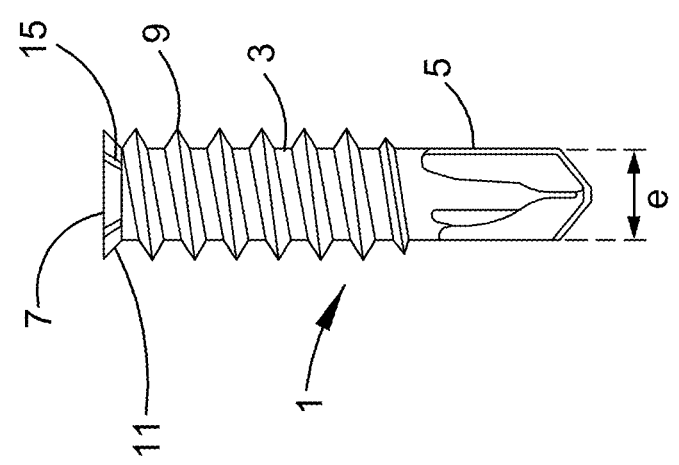
Fig. 2A
Fig. 2B
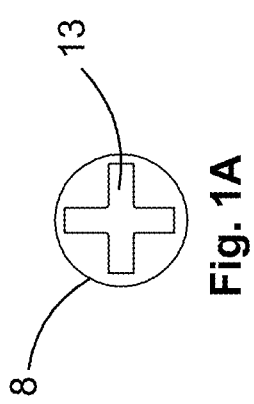
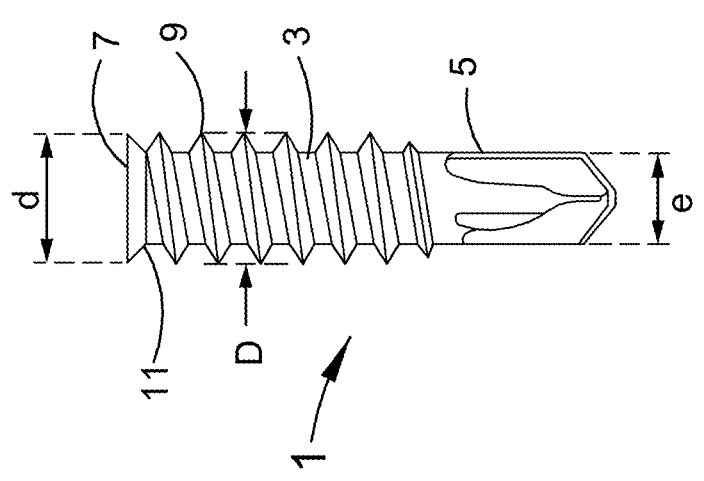
Fig. 3A
Fig. 3B

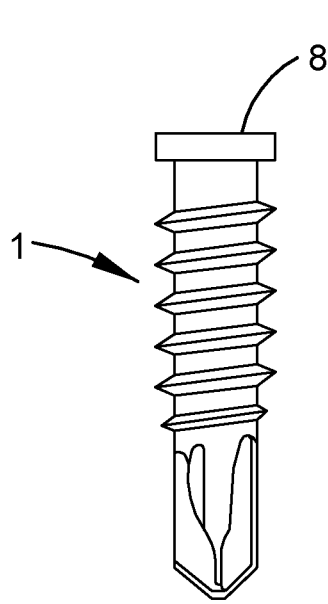
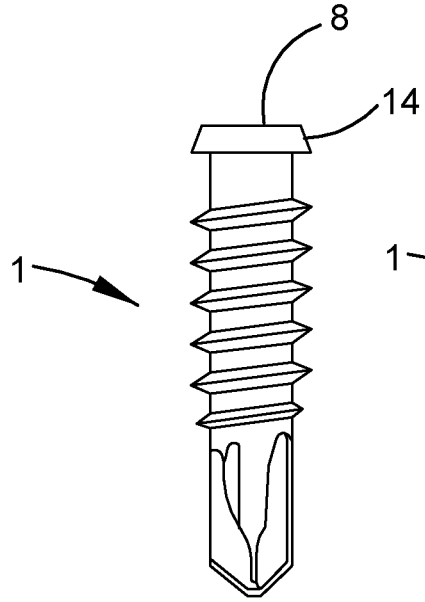
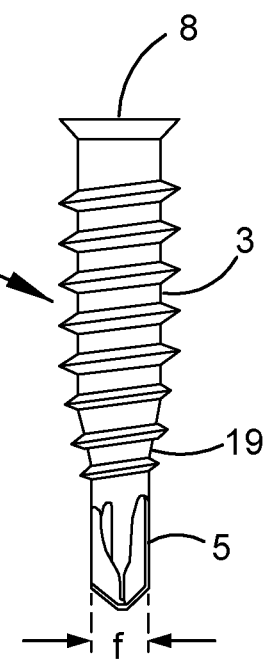
Fig. 4         Fig. 5         Fig. 6
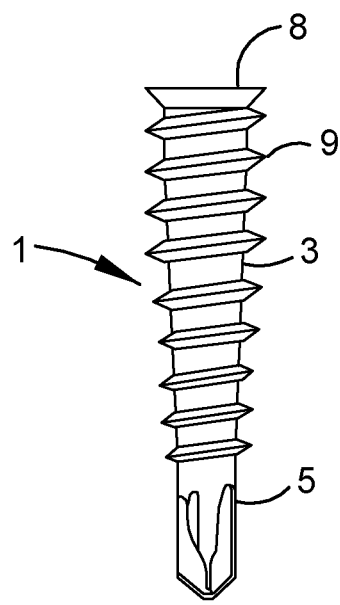
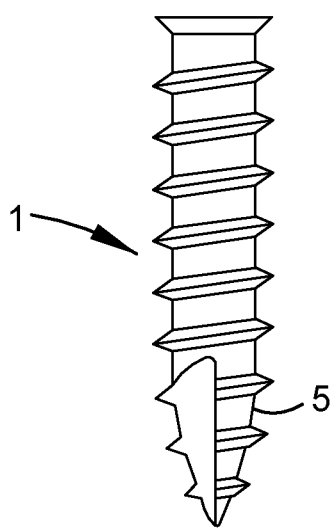
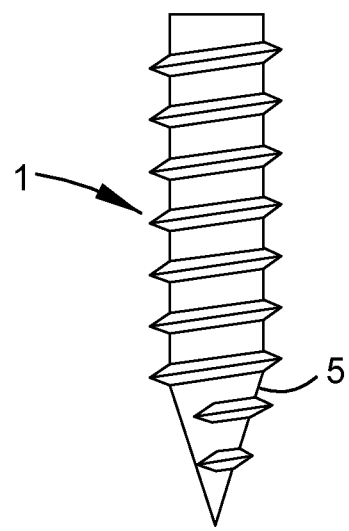
Fig. 7         Fig. 8         Fig. 9

SCREW FASTENERS FOR USE IN BUILDING CONSTRUCTION

This application claims priority under 35 U.S.C. § 119 to Australian Application No. 2019232872, filed Sep. 19, 2019, the entire contents of which are hereby incorporated herein by reference.

TECHNICAL FIELD

The present disclosure is generally directed to building products, and in particular to screw fasteners. More specifically, the present disclosure relates to the fastening of soffit linings under the eaves of buildings. It is however to be appreciated that the embodiments are not limited to such applications, and that other applications are also envisaged.

BACKGROUND

In the construction of timber framed buildings having eaves, the soffit lining is typically secured to the underside of the eaves using nails. Once the nails are driven through the soffit lining into the supporting timber frame, the hole created by the head of the nail and any hammer marks need to be stopped prior to painting. This ensures that a smooth surface is provided for painting, and that any visual evidence of the nailing of the soffit lining is hidden.

A current trend is the growth of steel framed buildings which prevents the use of nails to attach soffit linings and other panels to the frame. Therefore, self-drilling screw fasteners are now being used as an alternative fastener for securing soffit linings to the eaves of steel framed buildings.

A screw fastener which is currently used for this purpose has a large frustoconical shaped head. A series of ribs are provided on the frustoconical surface of that head. These ribs act to ream out the lining material as it is being driven into the panel. This results in the head of the screw fastener being countersunk within the lining panel material so that it is flush or just below the outer surface of that lining panel. This then allows for stopping of the screw heads prior to painting.

Soffit linings are typically made from a fibre cement board having a thickness of about 4.5 mm. The use of the previously noted screw fasteners does lead to problems when used with such soffit linings. Firstly, as the screw fastener is driven into the soffit lining board, material from the drilled and countersunk bore is forced out from that bore. This results in a phenomenon known as 'mushrooming, where an annular mound of fibre cement material from the bore is left surrounding the head of the screw fastener. This ring of material extends from the plane of the lining surface and must be sanded down back to the level of the lining surface. This is therefore an additional step that must be taken when installing soffit linings on steel framed buildings, which adds additional labor and cost to the installation task. Furthermore, the head of the previously described screw fastener has a longitudinal depth of around 3 mm. This means that there is very little left of supporting material around the screw fastener once it has been driven into the lining and the countersunk bore has been reamed in that lining. Such a connection is therefore inherently less strong for this reason.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

It would be advantageous to provide a screw fastener that addresses or ameliorates one or more of the abovenoted problems associated with the prior art.

SUMMARY

Some embodiments relate to a screw fastener comprising:
an elongate shank having a screw thread extending along at least a substantial portion of the shank;
a drive section located at one end of the shank for allowing the screw fastener to be rotatably driven into one or more material layers; and
a self-drilling or piercing point at an opposing end thereof for forming a bore in said one or more material layers;
wherein the drive section is dimensioned to minimise or avoid the need for countersinking of the formed bore.

Some embodiments relate to a screw fastener comprising:
an elongate shank having a screw thread extending along at least a substantial portion of the shank;
a drive recess located at one end of the shank for allowing the screw fastener to be rotatably driven into one or more material layers; and
a self-drilling or piercing point at an opposing end thereof for forming a bore in said one or more material layers.

Some embodiments relate to a screw fastener comprising:
a headless elongate shank having a screw thread extending along at least a substantial portion of the shank;
a fastener head having a drive recess located at one end of the shank for allowing the screw fastener to be rotatably driven into one or more material layers; and
a self-drilling or piercing point at an opposing end thereof for forming a bore in said one or more material layers;
wherein the fastener head has a lateral diameter at least substantially equal to or less than a maximum external diameter of the screw thread.

Some embodiments relate to a screw fastener comprising:
an elongate shank having a screw thread extending along at least a substantial portion of the shank;
a fastener head having a drive recess located at one end of the shank for allowing the screw fastener to be rotatably driven into one or more material layers; and
a self-drilling or piercing point at an opposing end thereof for forming a bore in said one or more material layers;
wherein the fastener head has a lateral diameter at least substantially equal to or less than a maximum external diameter of the screw thread.

Some embodiments relate to a screw fastener comprising:
an elongate shank having a screw thread extending along at least a substantial portion of the shank;
a fastener head having a drive recess located at one end of the shank for allowing the screw fastener to be rotatably driven into one or more material layers; and
a self-drilling or piercing point at an opposing end thereof for forming a bore in said one or more material layers;
wherein the fastener head has a lateral diameter up to around 40% greater than a maximum external diameter of the screw thread.

The drive section may be a part of the shank, and may have a lateral diameter at least substantially equal to a maximum diameter of the shank. Alternatively, the drive section may include a fastener head having a lateral diameter at least substantially equal to or less than a maximum diameter of the screw thread. It is also envisaged that the drive section may include a fastener head having a lateral diameter slightly greater than a maximum diameter of the screw thread. The lateral diameter of the fastener head may have a lateral diameter up to around 40% greater than the maximum diameter of the screw thread.

The drive section may be provided by a fastener head. The fastener head may be frustoconical in cross section, including a frustoconical surface facing the shank. The fastener head may further include one or more ribs located on the frustoconical surface and extending generally in a longitudinal direction of the shank. Alternatively, the fastener head may have a shape in the general form of a flat disc. The fastener head may have an outer peripheral edge providing a peripheral surface substantially aligned with the longitudinal extent of the shank. Alternatively, the fastener head may have an outer peripheral edge providing a peripheral surface substantially inclined at an acute angle to the longitudinal extent of the shank.

The self-drilling or piercing point may have a maximum diameter at least substantially equal to a maximum diameter of the elongate shank. Alternatively, the self-drilling or piercing point may have a maximum diameter less than a maximum diameter of the elongate shank. At least a portion of the elongate shank may taper towards the self-drilling or piercing point.

The drive section may include a drive recess therein through which the screw fastener can be driven. The drive recess may for example be square in shape or cross shaped. It is however also envisaged that other drive recess types including, but not limited to, Torx or allen key recesses be used in the screw fastener according to some embodiments.

The self-drilling or piercing point may be for drilling steel, and may for example be a SDS drill point. Alternatively, the self-drilling or piercing point may be for drilling timber, and may for example be a type 17 timber drill point. It is also envisaged that the drilling or piercing point may be a multipurpose drill point.

With the screw fastener according to the present disclosure, there is minimal loss of material during the driving of the screw fastener into the material. This is because there is little to no requirement to remove material for the purposes of providing countersinking of the bore to allow the head of the screw fastener to sit below or flush with the surface of the material. This thereby maintains the strength of the connection provided by the screw fastener. This also preferably avoids the problem of mushrooming of the surrounding material that arises when using conventional screw fasteners requiring a countersunk recess when installed.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments are further described with respect to the accompanying drawings. Other embodiments are possible, and consequently, the particularity of the accompanying drawings is not to be understood as superseding the generality of the preceding description of various embodiments.

In the drawings:

FIGS. 1A and 1B respectively show a top and side view of some embodiments of the disclosure;

FIGS. 2A and 2B respectively show a top and side view of some embodiments of the disclosure;

FIGS. 3A and 3B respectively show a top and side view of some embodiments of the disclosure;

FIG. 4 shows a side view of some embodiments of the disclosure;

FIG. 5 shows a side view of some embodiments of the disclosure;

FIG. 6 shows a side view of some embodiments of the disclosure;

FIG. 7 shows a side view of some embodiments of the disclosure;

FIG. 8 shows a side view of some embodiments of the disclosure; and

FIG. 9 shows a side view of some embodiments of the disclosure.

DESCRIPTION OF EMBODIMENTS

FIGS. 1A to 9 show various different embodiments of a screw fastener according to the present disclosure. For clarity reasons, the same reference numeral is used for features shared by each of the embodiments.

Referring initially to FIGS. 1A and 1B, there is shown a first embodiment of a screw fastener 1 according to the present disclosure. The screw fastener 1 has an elongate shank 3, with a self-drilling or piercing point 5 being provided at one end of the shank 3. In the embodiment shown in FIG. 1B, the self-drilling point 5 is in the form of a SDS drill point suitable for drilling into steel sheets. As will be subsequently described, the present disclosure is not limited to such SDS self-drilling points, and the use of alternative self-drilling or piercing points are also envisaged.

At the opposing end of the elongate shank 3 is provided a drive section 7 that allows the screw fastener 1 to be driven for rotation. In the embodiment shown in FIG. 1A, the drive section 7 is in the form of a frustoconical shaped fastener head 8 having a frustoconical surface 11 facing the shank 3. The drive recess 13 suitable for use by a Philips head screwdriver is provided at the top of the fastener head 8.

A screw thread 9 extends along at least a substantial portion of the shank 3. The screw thread has a maximum external diameter D as shown in FIG. 1B. In the embodiment shown in FIG. 1B, the fastener head 7 has a lateral diameter d substantially corresponding to the maximum diameter D of the screw thread 9. In addition, the SDS point 5 has a diameter substantially equal to the maximum diameter e of the shank 3.

FIGS. 2A and 2B show a second embodiment of a screw fastener 1 according to the present disclosure which shares all of the features of the previously described embodiment. The primary difference is the provision of a series of ribs 15 on the frustoconical surface 11 of the fastener head 8. These ribs 15 extend in a generally longitudinal direction of the shank 3 and assist in the reaming of a countersunk bore for accommodating the fastener head 8 within a panel such as a Soffit lining. It is to be appreciated that the use of the ribs 15 is not essential to the operation of the screw fastener, and that the fastener can still operate without such ribs as with the embodiment of FIGS. 1A and 1B. The embodiment shown in FIGS. 2A and 2B also share the same dimensional ratio of the maximum diameter D of the screw thread 9 being substantially equal to the lateral diameter d of the lateral fastener head 8. Furthermore, the SDS point 5 has a diameter substantially equal to the maximum diameter e of the shank 3.

FIGS. 3A and 3B show a third embodiment of the screw fastener 1 according to the present disclosure. This embodiment differs from the previously described embodiment in having a headless shank 3 with no fastener head 8 as in the earlier described embodiments. Rather, the drive section 7 is part of the shank 3 itself, with a drive recess 13 suitable for use by a square screwdriver being located within a peripheral end 17 of the shank 3. The advantage of this embodiment is that the screw fastener 1 can be entirely accommodated within the bore produced by the drilling point 5 without the need to provide any further clearance for a fastener head.

The first and second embodiments of the screw fastener 1 use a cross shaped 'Phillips' type drive recess 13 to allow the screw fastener 1 to be driven as shown in FIGS. 1A and 2A. The third embodiment of the screw fastener 1 however uses a square shaped drive recess 13. It is however to be appreciated that the present disclosure is not limited to these specific drive recess types, and that alternative types such as Torx or Allen key drive recesses could also be used.

FIG. 4 shows a fourth embodiment of the screw fastener 1 according to the present disclosure which shares all of the features of the previously described embodiments except for the fastener head 8 which is in the general form of a flat disc. Such a fastener head 8 can be also driven into, and be flush with the surface of the panel without the need for any countersinking of the bore. It is however also envisaged that the fastener head 8 remain above the surface of the panel when fully seated if desired.

FIG. 5 shows a fifth embodiment of the screw fastener 1 according to the present disclosure the fastener head 8 only differs from the fastener head shown in the embodiment of FIG. 4 in having an outer peripheral edge 14 providing a peripheral surface of substantially inclined at an acute angle to the longitudinal extent of the shank 3. The fastener head 8 of this embodiment can also be driven flush with the surface of the panel following installation of the screw fastener 1.

In all of the previously described embodiments, the outer diameter e of the elongate shank 3 is generally constant along the elongate extent of the screw fastener 1. The sixth embodiment of the screw fastener 1 according to the present disclosure shown in FIG. 6 does however have a SDS drill point 5 having a significantly narrower outer lateral diameter f than the maximum diameter e of the elongate shank 3. Therefore, a tapered section 19 connecting the elongate shank 3 to the drilling point 5 is provided in this embodiment. This embodiment however shares the same feature of the fastener head 8 having an lateral diameter d substantially equal to the maximum external diameter D of the screw thread 9.

The seventh embodiment of the screw fastener 1 shown in FIG. 7 shares many of the features of the embodiment shown in FIG. 6 except that the elongate shank 3 constantly tapers from the fastener head 8 to the SDS drilling point 5. However, as in the previously described embodiment, the lateral diameter d of the fastener head 8 is substantially equal to the maximum diameter D of the screw thread 9.

The eighth embodiment of the screw fastener 1 according to the present disclosure shown in FIG. 8 has features that generally correspond to the features of the embodiment shown in FIGS. 1A and 1B. The primary difference is that the self drilling point 5 is a type 17 timber drill point. This embodiment is therefore suitable for use in timber and thin metal.

The ninth embodiment of the screw fastener 1 according to the present disclosure shown in FIG. 9 shares many of the features of the embodiment shown in FIGS. 3A and 3B. In particular, this embodiment does not have any fastener head similar to the embodiment shown in FIGS. 3A and 3B. The other difference is that the self-drilling point 5 used in this embodiment is a multi-purpose drill point making it suitable for use with a variety of different materials.

In all of the above described embodiments, the described screw fastener 1 either has no fastener head (see FIGS. 3A and 3B, and 9) or has a fastener head 8 with a lateral diameter d substantially equal to the maximum outer diameter D of the screw thread 9. It is however to be appreciated that the lateral diameter d of the fastener head 8 could also be slightly larger than the maximum diameter D of the screw thread while still allowing the screw fastener to operate according to the present disclosure. For example, the lateral diameter of the fastener head 8 could be up to around 40% higher than the maximum diameter of the screw thread 9 Current self-drilling or self-piercing screw fasteners designed under current industry standards typically have fastener heads with a lateral diameter substantially greater than the maximum diameter of the screw thread. This is because the drive recess needs to be dimensioned to allow for a sufficient torque to be transferred by the driving tool to that fastener. It has however been found that fastener heads having more narrow lateral diameters or with no fastener head can still support a drive recess of sufficient size to allow for the necessary torque to be transferred to the screw fastener dependent upon the diameter of the screw shank 3 and the type of drive recess.

All of the above described embodiments can be used in soffit linings. The self drilling or piercing point will vary depending upon whether the building is a steel frame or timber frame type. The screw fasteners 1 according to the present disclosure has a drive section 7 which is shaped to minimise or avoid the need for countersinking of the bore formed by the screw fastener 1. This can minimise or prevent mushrooming of the soffit lining material around the fastener head 8. It is believed that because the fastener head 8 is dimensioned to be accommodated with minimal or no countersinking of the panel material, the minimal material that is removed through countersinking of the fastener head is pulled into the clearance provided by the screw thread 9 as the bore is formed. As little to no panel material is required to be pushed out from the bore, there is little to no mushrooming of the surrounding panel material. Embodiments of the present disclosure allow the fastener head to avoid any issue associated with the need to countersink and/or remove the extracted materials. This is also the case in embodiments where the fastener head 8 is allowed to remain flush with the panel.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A screw fastener comprising:
   an elongate shank having a screw thread extending along at least a substantial portion of the shank, wherein the shank is solid;
   a drive section located at one end of the shank for allowing the screw fastener to be rotatably driven into one or more material layers; and
   a self-drilling or piercing point at an opposing end thereof for forming a bore in said one or more material layers;
   wherein the drive section includes a fastener head having a lateral diameter less than or equal to 40% greater than the maximum diameter of the screw thread to allow the fastener head to follow into the bore and for the fastener head to finish flush with, or below a surface of, the one or more material layers while minimising deformation or damage to the surface.

2. A screw fastener according to claim 1, wherein the drive section is part of the shank, and has a lateral diameter at least substantially equal to a maximum diameter of the shank.

3. A screw fastener according to claim 1, wherein the drive section includes a fastener head having a lateral diameter at least substantially equal to a maximum diameter of the screw thread.

4. A screw fastener according to claim 3, wherein the fastener head is frustoconical in cross section, including a frustoconical surface facing the shank.

5. A screw fastener according to claim 4, further including one or more ribs located on the frustoconical surface and extending generally in a longitudinal direction of the shank.

6. A screw fastener according to claim 3, wherein the fastener head has a shape in the general form of a flat disc.

7. A screw fastener according to claim 6, wherein the fastener head has an outer peripheral edge providing a peripheral surface substantially aligned with the longitudinal extent of the shank.

8. A screw fastener according to claim 6, wherein the fastener head has an outer peripheral edge providing a peripheral surface substantially inclined at an acute angle to the longitudinal extent of the shank.

9. A screw fastener according to claim 1, wherein the drive section includes a fastener head having a lateral diameter less than the outer diameter of the screw thread.

10. A screw fastener according to claim 1, wherein the self-drilling or piercing point has a maximum diameter at least substantially equal to a maximum diameter of the elongate shank.

11. A screw fastener according to claim 1, wherein the self-drilling or piercing point has a maximum diameter less than a maximum diameter of the elongate shank.

12. A screw fastener according to claim 11, wherein at least a portion of the elongate shank is tapered towards the self-drilling or piercing point.

13. A screw fastener according to claim 1, wherein the drive section includes a drive recess therein through which the screw fastener can be driven.

14. A screw fastener according to claim 13, wherein the drive recess is one of: square in shape; cross shaped; or Torx shaped.

15. A screw fastener according to claim 1, wherein the self-drilling or piercing point is for drilling steel.

16. A screw fastener according to claim 1, wherein the self-drilling or piercing point is for drilling timber or thin metal.

17. A screw fastener according to claim 1, wherein the self-drilling or piercing point is a multi-purpose drill point.

* * * * *

UNITED STATES PATENT AND TRADEMARK OFFICE
CERTIFICATE OF CORRECTION

| | |
|---|---|
| PATENT NO. | : 11,598,362 B2 |
| APPLICATION NO. | : 16/716835 |
| DATED | : March 7, 2023 |
| INVENTOR(S) | : Neville Deutscher |

It is certified that error appears in the above-identified patent and that said Letters Patent is hereby corrected as shown below:

On the Title Page

Item (73) Assignee
Delete "IDEAL FASTERNERS PTY LTD., Victoria (AU)" and insert --IDEAL FASTENERS PTY LTD., Victoria (AU)--

Signed and Sealed this
Twenty-first Day of May, 2024

Katherine Kelly Vidal
*Director of the United States Patent and Trademark Office*